(12) United States Patent
Paek

(10) Patent No.: US 6,918,056 B2
(45) Date of Patent: Jul. 12, 2005

(54) INTERNET-BASED SERVICE SYSTEM AND METHOD FOR REMOTELY RESTORING DAMAGED DATA AND FILES

(75) Inventor: Dong Hyun Paek, Seoul (KR)

(73) Assignee: High Antivirus Research Inc., Seoul (KR)

( * ) Notice: Subject to any disclaimer, the term of this patent is extended or adjusted under 35 U.S.C. 154(b) by 532 days.

(21) Appl. No.: 10/182,211

(22) PCT Filed: Feb. 15, 2001

(86) PCT No.: PCT/KR01/00222

§ 371 (c)(1),
(2), (4) Date: Jul. 25, 2002

(87) PCT Pub. No.: WO01/63418

PCT Pub. Date: Aug. 30, 2001

(65) Prior Publication Data

US 2003/0093707 A1 May 15, 2003

(30) Foreign Application Priority Data

Feb. 26, 2000 (KR) .......................... 2000-9647

(51) Int. Cl.⁷ .............................................. G06F 11/00
(52) U.S. Cl. .......................................... 714/27; 714/38
(58) Field of Search ............................... 714/27, 4, 38, 714/26; 717/168, 178

(56) References Cited

U.S. PATENT DOCUMENTS

| | | | | |
|---|---|---|---|---|
| 5,140,419 A | * | 8/1992 | Galumbeck et al. | ........ 348/465 |
| 5,771,354 A | * | 6/1998 | Crawford | ................... 709/229 |
| 5,815,722 A | * | 9/1998 | Kalwitz et al. | ............. 717/178 |
| 6,023,586 A | | 2/2000 | Gaisford et al. | ............. 395/712 |
| 6,049,671 A | | 4/2000 | Slivka et al. | ................ 395/712 |
| 6,065,017 A | | 5/2000 | Barker | ........................ 707/202 |
| 6,073,214 A | * | 6/2000 | Fawcett | ...................... 711/133 |
| 6,205,579 B1 | * | 3/2001 | Southgate | .................... 717/173 |
| 6,330,715 B1 | * | 12/2001 | Razzaghe-Ashrafi | ........ 717/171 |
| 6,553,507 B1 | * | 4/2003 | Cohen | ........................... 714/4 |
| 6,757,837 B1 | * | 6/2004 | Platt et al. | ...................... 714/4 |
| 6,785,834 B2 | * | 8/2004 | Chefalas et al. | ............... 714/4 |
| 6,829,732 B2 | * | 12/2004 | Whiteside et al. | ............ 714/38 |
| 2002/0026634 A1 | * | 2/2002 | Shaw | ......................... 717/173 |

FOREIGN PATENT DOCUMENTS

JP 9212377 8/1997

OTHER PUBLICATIONS

English Abstract of JP 9–212377 dated Aug. 15, 1997.

* cited by examiner

*Primary Examiner*—Bryce P. Bonzo
*Assistant Examiner*—Marc M Duncan
(74) *Attorney, Agent, or Firm*—Ladas & Parry

(57) ABSTRACT

Disclosed is internet-based service system and method for remotely restoring damaged data and files through the internet in case that the data and files stored in the hard discs and floppy discs of client personal computers (PC) are partly or entirely damaged. If a user connects to a restoration server through the internet network, a restoration plug-in module of client PCs and a restoration plug-in module of the restoration server will be compared after judging whether the user is registered. The damaged data and files will be restored by using the restoration plug-in module stored at client PC, a restoration result will be recorded and transfer to the restoration server for analyzing the result and the analyzed result will be transferred to client PC and simultaneously recorded on database.

6 Claims, 6 Drawing Sheets

INTERNET-BASED SERVICE SYSTEM AND METHOD FOR REMOTELY RESTORING DAMAGED DATA AND FILES

BACKGROUND OF THE INVENTION

1. Technical Field

The present invention relates to internet-based service system and method for remotely restoring data and files, and more particularly to internet-based service system and method for remotely restoring part or all of damaged data and files stored in a hard disc or a floppy disc of a client personal computer(PC) due to various causes.

2. Reference to Related Patent Applications

U.S. Pat. No. 5,140,419 Communication system U.S. Pat. No. 5,771,354 Internet online backup system provides remote storage for customers using IDs and passwords which were interactively established when signing up for backup services U.S. Pat. No. 5,815,722 In an interactive network board, a method and apparatus for remotely downloading and executing files in a memory.

3. Description of Related Arts

Recently, personal computers(PCs; computers available for individuals are referred to) are widely used for various affairs in corporations and institutions, so it may have a vital influence on the affairs of those who use the personal computers that particular data and files stored in the personal computers get damaged or lost.

In the past, the damage to or the loss of data and files stored in a storage medium such as hard discs, floppy discs, or the like, of the PCs have mainly occurred due to wrong manipulations of users or physical defects of the storage medium which stores the data and files.

However, in recent, the cases that the data and files get damaged due to the computer virus have been increased, and the data and files get damaged in various types.

Even though important data and files get damaged, the damaged data and files can be easily restored in case that backups or copies of the data and files exist. However, otherwise, it is very difficult to restore the damaged data and files to the original state. In the worst case, the restoration of the damaged data and files becomes impossible.

As stated above, in case that the data and files stored in the hard discs or the floppy discs of the PCs get damaged, the users bring to specialized data-restoring centers the hard discs and floppy discs they want to restore, or the users purchase data-restoring programs, install them into the personal computers to which hard discs or floppy discs to be restored are connected, and execute the restoration of them.

However, in case that users leave damaged data and files in specialized data-restoring centers for-restoration, there exists a problem in that corporations and institutions avoid the use of the centers since high costs are required for the restoration of the data and the files at the same time as important information in the discs gets leaked out.

Further, in case that users wish to restore damaged data and files by using a restoration program, there exists a problem in that the restoration program should be installed in computer systems prior to the damages to the data and files.

Furthermore, there still exists a problem in that the updates of the restoration programs are not rapidly made enough to effectively cope with the damages to the data and files caused by brand-new computer viruses and the like.

SUMMARY OF THE INVENTION

In order to solve the above problems, it is an object of the present invention to provide internet-based service system and method for remotely restoring damaged data and files, in case that part or all of data and files stored in hard discs and floppy discs of client personal computers is damaged due to various causes, by providing remote restoration services from a restoration server to the hard discs and floppy discs connected to the personal computers accessible to the internet.

In order to achieve the above object, a system according to the present invention comprises an internet network; plural client personal computers(PCs) for transferring log-in data through the internet network, transferring through the internet network information on a restoration plug-in module stored at present in response to a restoration plug-in module check signal transferred in correspondence with the log-in data, installing a restoration plug-in module inputted through the internet network in correspondence to the restoration plug-in module information, using the installed restoration plug-in module to restore damaged data and files in a storage medium, transferring a result of the restoration through the internet network, and outputting on screens analysis result data transferred through the internet network; and a restoration server connected to the respective client PCs through the internet network, and for judging whether a user is registered by using the log-in data inputted from the client PCs, transferring the restoration plug-in module check signal to the client PCs through the internet network in order to check the restoration plug-in module stored in the client PCs in case that the user is registered, controlling the restoration plug-in module of the client PCs through the restoration plug-in module information transferred from the client PCs through the internet, analyzing a result of the restoration transferred from the client PCs, and transferring the analysis result to the client Pcs.

In order to achieve the above object, a method according to the present invention comprises steps of 4. An internet-based service method for remotely restoring damaged data and files, comprising steps of (1) connecting to a restoration server through a communication program of a client personal computer(PC); (2) executing a user authentication routine after the connection to the restoration server; (3) executing a routine for comparing a restoration plug-in module of the client PC with a restoration plug-in module of the restoration server; (4) restoring damaged data and files by using the restoration plug-in module equipped in the client PC through the comparison routine step and storing the result; (5) transferring the restoration result to the restoration server and requesting a result analysis; and (6) transferring the analyzed result to the client PC and computerizing the result in a database.

BRIEF DESCRIPTION OF THE DRAWINGS

The above object and other advantages of the present invention will become more apparent by describing in detail a preferred embodiment thereof with reference to the attached drawings, in which.

BEST MODE FOR CARRYING OUT THE INVENTION

Hereinafter, an embodiment of the present invention will be described in detail with reference to the accompanying drawings.

Figure 1:
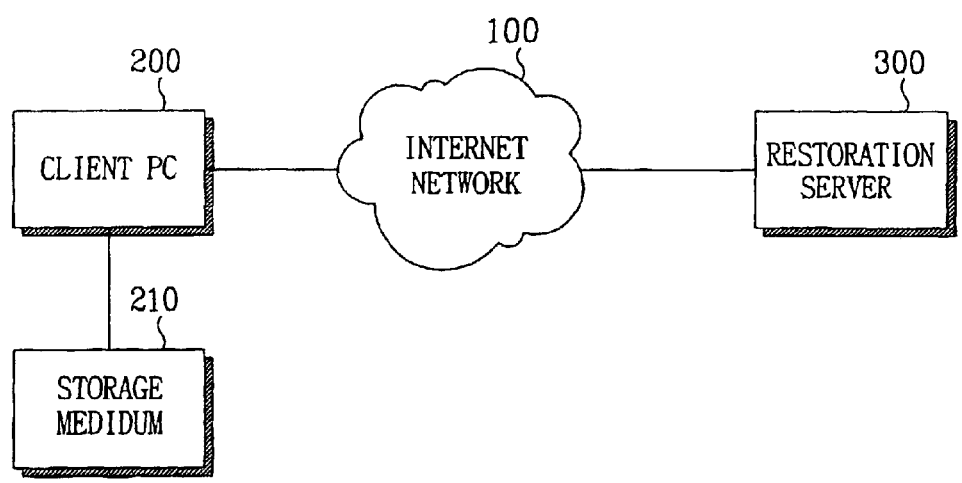
FIG. 1 is a block diagram for conceptually explaining a structure of an internet-based service system for remotely restoring damaged data and files according to an embodiment of the present invention.

FIG. 1 is a block diagram for conceptually explaining a structure of an internet-based service system for remotely restoring damaged data and- files according to an embodiment of the present invention.

As shown in FIG. 1, an internet network 100 enables at least one client personal computer(PC) 200 to a restoration server 300.

The client PC-200 transfers log-in data to the restoration server 300 through the internet network 100. The client PC 200 receives a restoration plug-in module check signal corresponding to the log-in data already transferred from the restoration server 300. The client PC 200 transfers information on a restoration plug-in module(refer to a reference numeral 202 in FIG. 2) stored therein at present in response to the received restoration plug-in module check signal.

In response to the transferred restoration plug-in module information, the client PC 200 installs a restoration plug-in module(refer to a reference numeral 302 in FIG. 3) inputted from the restoration server 300 through the internet network 100. Of course, in case that the restoration server 300 uses an more updated module than the restoration plug-in module stored in the client PC 200 at present, the restoration plug-in module of the client PC 200 gets updated.

The client PC 200 restores damaged data and files in a storage medium 210 by using the installed restoration plug-in module(refer to the reference numeral 202 in FIG. 2), and transfers a restoration result to the restoration server 300 through the internet network 100. Further, the PC 200 outputs on a screen analysis result data transferred from the restoration server 300 through the internet 100.

The restoration server 300 is connected to respective client PCs 200 through the internet network 100. The restoration server 300 judges whether a user is registered by using the log-in data inputted from the client PC 200, and, in case of a registered user, transfers to the client PC 200 through the internet network 100 the restoration plug-in module check signal for checking the restoration plug-in module(refer to the reference numeral 202 in FIG. 2) stored in the client PC 200.

The restoration server 300 controls the restoration plug-in module(refer to the reference number 202 in FIG. 2) of the client PC 200 based on the restoration plug-in module information received from the client PC 200 through the internet network 100. The restoration server 300 analyzes a restoration result transferred from the client PC 200, and transfers the analyzed result to the client PC 200.

The storage medium 210 may be hard discs, floppy discs, and so on, equipped in the client PC 200, or the other types of storage medium in which data and files may be stored.

Figure 2:
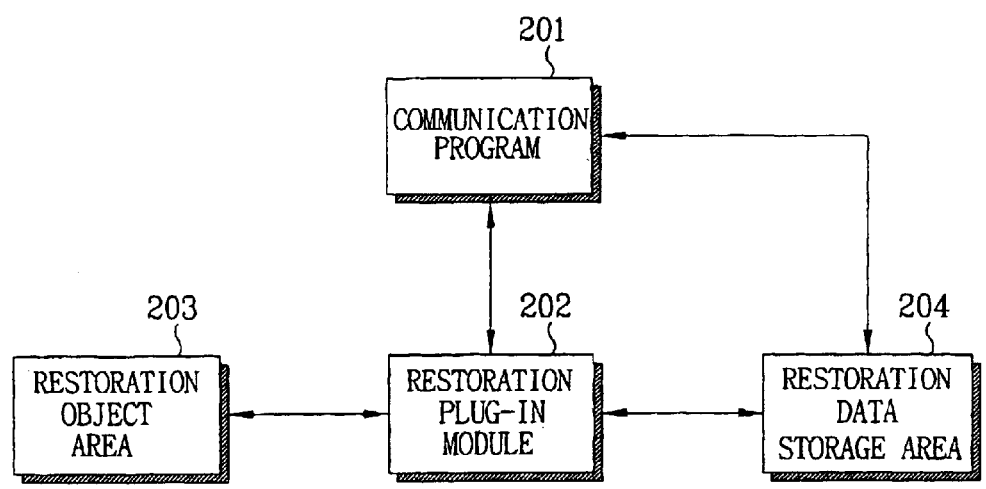
FIG. 2 is a schematic block diagram for explaining a structure of a client personal computer applied to FIG. 1.

The client PC 200, as shown in FIG. 2, includes a communication program 201, the restoration plug-in module 202, a restoration object area 203, and a restoration data storage area 204.

The communication program 201 performs a communication connection to the restoration server 300. Here, the communication program 201, may be a web browser.

The restoration plug-in module 202, in case that the restoration plug-in module 202 is in a communication connection with the restoration server 300 through the communication program 201, restores damaged data and files by means of a restoration program transferred from the restoration server 300 as well as stores restored data and files in the restoration data storage area 204. The restoration plug-in module 202 may be included in the communication program 201, differently from FIG. 2.

Further, the restoration plug-in module 202 transfers the restoration result to the restoration server 300 through the communication program 201 and receives the analysis result transferred from the restoration server 300 according to the restoration result.

The restoration object area 203 has partly or entirely damaged data or files. The partly or entirely damaged data or files located in the restoration object area 203 are restored by the restoration plug-in module 202.

The restoration data storage area 204 stores data and files restored by the restoration plug-in module 202.

Figure 3:
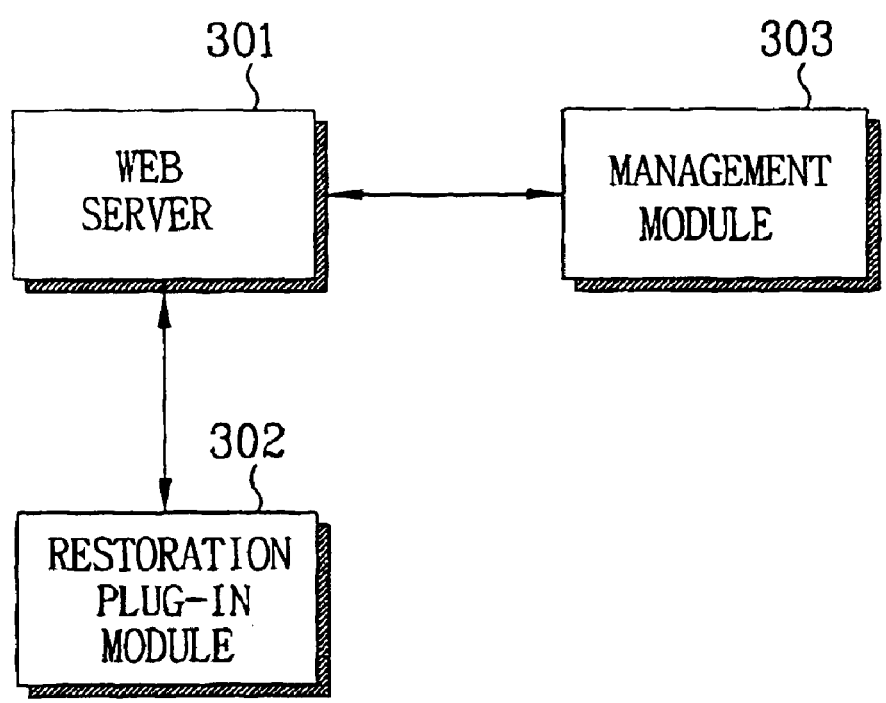
FIG. 3 is a schematic block diagram for explaining a structure of a restoration server applied to FIG. 1.

The restoration, server 300, as shown in FIG. 3, has a web server 301, a restoration plug-in module 302, and a management module 303.

The web server 301 executes a communication connection to the client PC 200 through the internet network 100, and transfers to a communication-connected client PC 200 the restoration program inputted from the restoration plug-in module 302.

In the meantime, the web server 301 outputs a restoration result transferred from the client PC 200 to the management module 303, and transfers an analysis result corresponding to the restoration result to the client PC 200.

The restoration plug-in module 302 has a restoration program inputted by a server administrator, and transfers the restoration program to the web server 301 according to a transfer control of the management module 303.

The management module 303, in case that a communication connection of the client PC 200 and the web server 301 is carried out, checks whether the restoration plug-in module(refer to the reference numeral 202 in FIG. 2) of the same version is stored in the client PC 200 and, in case that it is not stored, transfers the restoration plug-in module 302 through the web server 301.

If the restoration plug-in module is stored as a result of the check on whether the restoration plug-in module(refer to the reference numeral 202 in FIG. 2) is stored in the client PC 200, the management module 303 compares the stored restoration plug-in module(refer to the reference numeral 202 in FIG. 2) with the restoration plug-in module 302 stored in the restoration server 300 and judges if the client PC 200 has the same version of it.

If not the same version as a result of the judgement, the management module 303 controls the restoration plug-in module 302 to transfer a restoration program to the web server 301, and the web server 301 transfers the restoration program to the client PC 200. Accordingly, the client PC 200 and the restoration plug-in modules 202 and 302 of the restoration-server 300 have the same version.

In the meantime, the management module 303 analyzes a restoration result inputted from the web server 301, and transfers the analyzed result to the web server 301 at the same time with computerizing the analyzed result in a database by corresponding to the log-in data.

Figure 4:
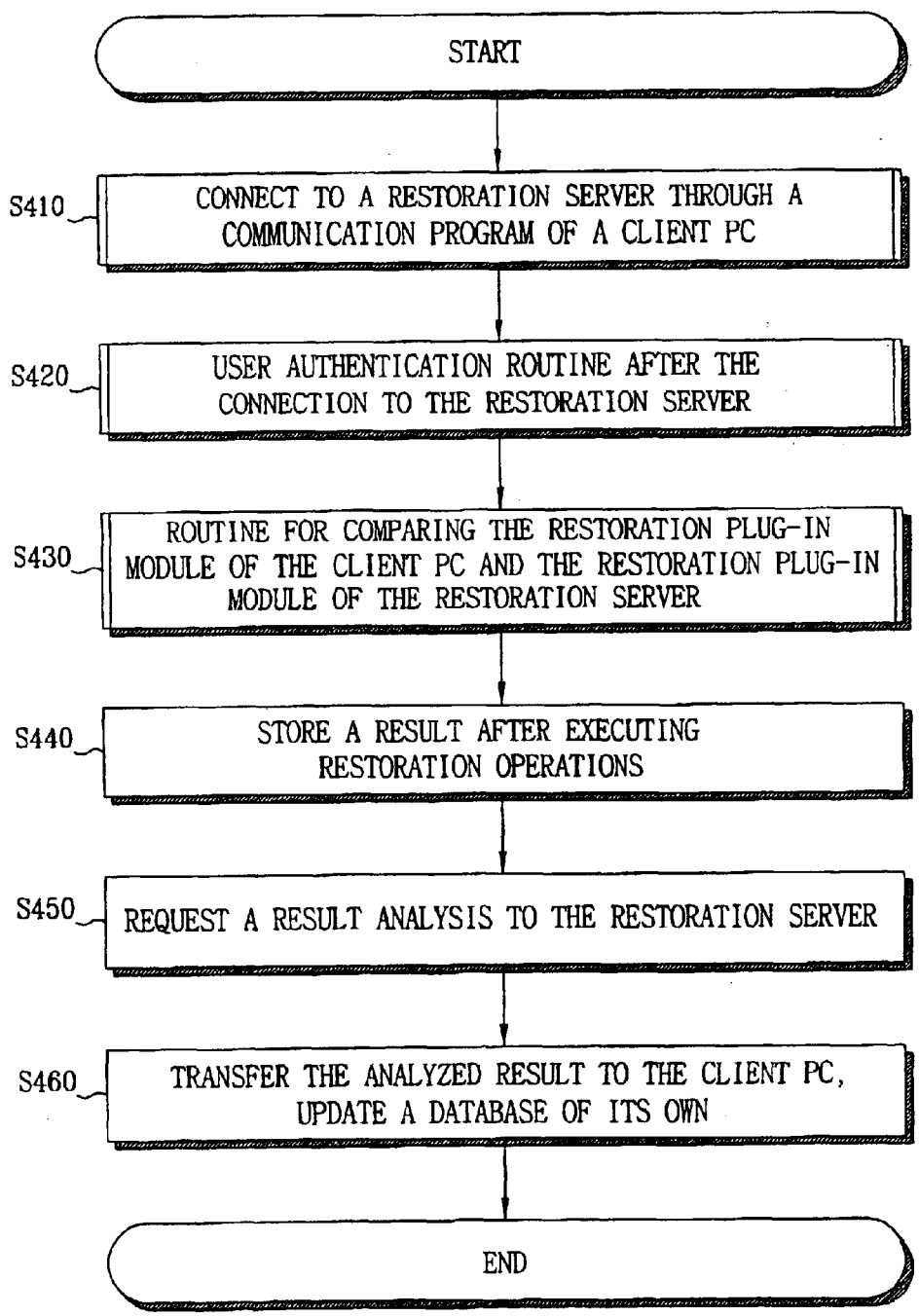
FIG. 4 to FIG. 6 are flow charts for explaining an internet-based method for remotely restoring damaged data and files according to an embodiment of the present invention.

Operations of the internet-based service system for remotely restoring damaged data and files according to an embodiment of the present invention will be described in more detail as follows with reference to FIG. 4 to FIG. 6.

First of all, a user of the client PC 200 connects to the restoration server 300 through the communication program 201(S410).

As stated above, if the client PC 200 is connected to the restoration server 300, the restoration server 300 executes a user authentication route for identifying whether the user of the client PC 200 in the communication connection is a registered user(S420).

Figure 5:
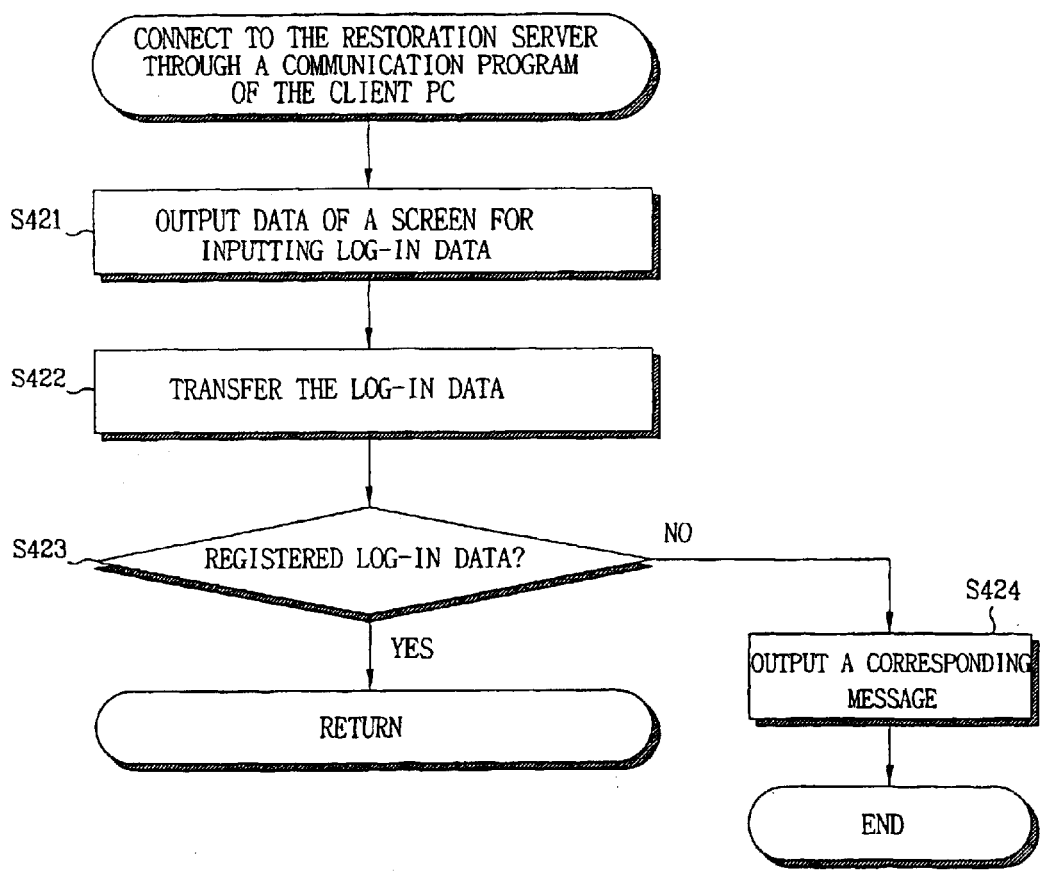
Figure 6:
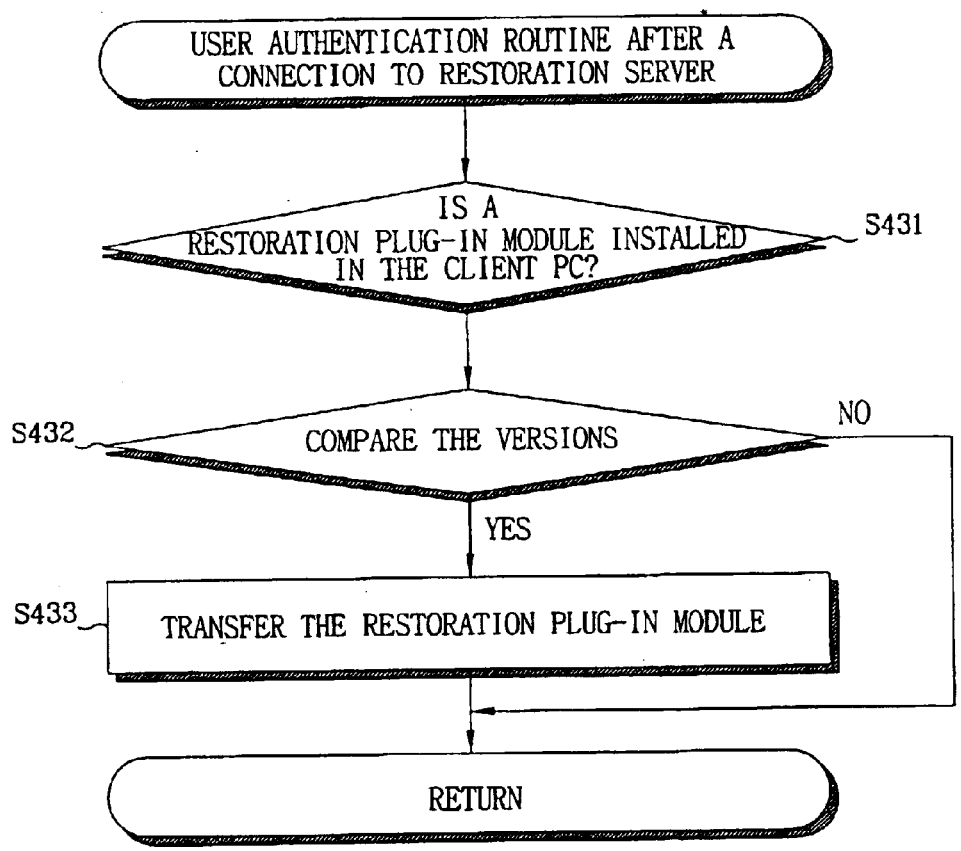

That is, the user authentication routine S420 is processed in the sequence shown in FIG. 5 attached herewith. First of all, the restoration server 300 outputs to the client PC 200 screen data for inputting the log-in data(S421).

If the user inputs the log-in data through the screen for inputting the log-in data, the client PC 200 transfers the log-in data to the restoration server 300 through the internet network 100(S422).

Accordingly, the restoration server 300 judges whether the log-in data received through the internet network 100 is a registered log-in data in a database of the management module 303(S423). As a result of the judgement, in case-that the log-in data inputted by the user is the log-in data registered in the database, the restoration server 300 returns to a main program and executes a routine for comparing the restoration plug-in module.

If the log-in data inputted by the user is not the registered data, the restoration server 300 outputs a message such as □Get a membership, please□ to the client PC 200 through the internet network 100(S424).

As stated above, if the process for the user authentication is -completed, the restoration server 300 executes a routine for comparing the restoration plug-in module 202 installed in the client PC 200 and the restoration plug-in module 302 of the restoration server 300(S430).

That is, as a result of the judgement of the step S431, in case that the restoration plug-in module 202 is installed in the client PC 200, the restoration server 300 compares the versions of the restoration plug-in module 202 of the client PC 200 and the restoration plug-in module 302 of the restoration server 300(S432).

If the restoration plug-in module 302 is not installed in the client PC 200, the restoration server 300 transfers the restoration plug-in module 302 to the client PC 200 to have the restoration plug-in module 202 installed in the client PC 200, and returns to the main program to thereby execute a data and files restoring step S440.

As a result of the comparison of the step S432, if the version of the restoration plug-in module 202 of the client PC 200 is lower than the version of the restoration plug-in module 302, the restoration server 300 transfers the restoration plug-in module 302 to the client PC 200 through the web server 301(S433), and updates information on the restoration plug-in module stored in the client PC 200.

If the versions of the restoration plug-in module 202 equipped in the client PC 200 and the restoration plug-in module 302 equipped in the restoration server 300 are the same, the restoration server 300 returns to the main program and executes the data and files restoring step S440.

As stated above, if the restoration plug-in module of the updated version is installed in the client PC 200 through the comparison routine step S430, the restoration plug-in module 202 restores damaged data and files stored in the restoration object area 203, and stores the restored data and files and the restoration result in the result storage area 204(S440).

In the meantime, the restoration plug-in module 202 stores the restoration result in the client PC 200 as stated above as the same time with transferring the restoration result to the restoration server 300, and requests an analysis with respect to the restoration result(S450).

Next, the restoration server 300 analyzes the restoration result of the client PC 200, transfers the analysis result to the client PC 200, and registers the analysis result in the database of the management module 303 by matching it with the log-in data(S460).

INDUSTRIAL APPLICABILITY

As described above, the internet-based service system for remotely restoring damaged data and files has an effect in restoring the data and files damaged by computer viruses or users□s mistakes as well as easily recovering hard discs which are not booted due to the damages to the boot area or the FAT area.

Further, the present invention, even though separate restoration programs are not provided all the time, has an effect in that instant restorations are available if there is a personal computer nearby which is accessible to the internet.

Further, since the present invention is based on remote restoration services through the internet and enables the actual restoration plug-in module employed for the restoration of damaged data and files to be updated to a latest program, the present invention has an effect in efficiently coping with the restoration of data and files damaged by brand-new computer viruses.

Although the preferred embodiment of the present invention has been described, it will be understood by those skilled in the art that the present invention should not be limited to the described preferred embodiment, but various changes and modifications can be made within the spirit and scope-of the present invention as defined by the appended claims.

What is claimed is:

1. An internet-based service system for remotely restoring damaged data and files, comprising:
    an internet network;
    plural client personal computers(PCs) for transferring log-in data through the internet network, transferring through the internet network information on a restoration plug-in module stored at present in response to a restoration plug-in module check signal transferred in correspondence with the log-in data, installing a restoration plug-in module inputted through the internet network in correspondence to the restoration plug-in module information, using the installed restoration plug-in module to restore damaged data and files in a storage medium, transferring a result of the restoration through the internet network, and outputting on screens analysis result data transferred through the internet network; and a restoration server connected to the respective client PCs through the internet network, and for judging whether a user is registered by using the log-in data inputted from the client PCs, transferring the restoration plug-in module check signal to the client PCs through the internet network in order to check the restoration plug-in module stored in the client PCs in case that the user is registered, controlling the restoration plug-in module of the client PCs through the restoration plug-in module information transferred from the client PCs through the internet, analyzing a result of the restoration transferred from the client PCs, and transferring the analysis result to the client PCs.

2. The internet-based service system as claimed in claim 1, wherein each of the client PCs includes:

a communication program for executing a communication connection to the restoration server;

a restoration plug-in module included in the communication program, and for restoring damaged data and files by a restoration program transferred from the restoration server in case that the communication connection is made with the restoration server through the communication program, storing restored data and files in a certain area, transferring a result of the restoration to the restoration server through the communication program, and receiving a result of an analysis transferred from the restoration server according to the restoration result;

a restoration object area having the damaged data and files and restored by means of the restoration plug-in module; and a restoration data storage area for storing the data and files restored by means of the restoration plug-in module.

3. The internet-based service system as claimed in claim 1, wherein the restoration server includes:

a web server for executing the communication connection with the client PCs through the internet network, transferring the restoration program-inputted from external to the communication-connected client PCs, outputting the restoration result transferred from the client PCs to the external, and transferring the analysis result corresponding to the restoration result to the client PCs;

a restoration plug-in module having the restoration program inputted by a server administrator, and for transferring the restoration program to the web server according to an external transfer control; and a management module, in case that the client PCs and the web server are communication-connected, for checking whether the restoration plug-in module is stored in the client PCs, transferring the restoration plug-in module through the web server in case that the restoration plug-in module is not stored, comparing the stored restoration plug-in module and the restoration plug-in module stored in the web server in case that the restoration plug-in module is stored, transferring the restoration plug-in module to the web server by judging whether the versions of the two are the same, analyzing a result of the restoration inputted from the web server, transferring the analyzed result to the web server, and computerizing the analyzed result in a database in correspondence to the log-in data.

4. An internet-based service method for remotely restoring damaged data and files, comprising steps of:

(1) connecting to a restoration server through a communication program of a client personal computer(PC);

(2) executing a user authentication routine after the connection to the restoration server;

(3) executing a routine for comparing a restoration plug-in module of the client PC with a restoration plug-in module of the restoration server;

(4) restoring damaged data and files by using the restoration plug-in module equipped in the client PC through the comparison routine step and storing the result;

(5) transferring the restoration result to the restoration server and requesting a result analysis; and (6) transferring the analyzed result to the client PC and computerizing the result in a database.

5. The internet-based service method as claimed in claim 4, wherein the step (2) for executing the user-authentication routine includes steps of:

(2-1) outputting screen data from the restoration server for inputting log-in data to the client PC;

(2-2) transferring the log-in data to the restoration server in case that a user of the client PC inputs the log-in data through the screen for inputting the log-in data;

(2-3) judging by the restoration server whether the received log-in data is log-in data registered in a management module; and (2-4) executing the step(3) for executing a routine for comparing the restoration plug-in modules in case that the log-in data is the registered log-in data, and outputting a corresponding message in case that the log-in data is not the registered log-in data.

6. The internet-based service method as claimed in claim 4, wherein the step (3) for executing the routine for comparing the restoration plug-in modules includes steps of:

(3-1) judging whether the restoration plug-in module is installed in the client PC through the web server;

(3-2) comparing the versions of the restoration plug-in module of the client PC and the restoration plug-in module of the restoration server in case that the restoration plug-in module is installed in the client PC; and (3-3) transferring the restoration plug-in module from the restoration server to the client PC in case that the version of the restoration plug-in module of the client PC is lower than the version of the restoration plug-in module of the restoration server.

* * * * *